United States Patent
Nagatsuka

(10) Patent No.: US 12,536,909 B2
(45) Date of Patent: Jan. 27, 2026

(54) VEHICLE DRIVE CONTROL DEVICE, VEHICLE CONTROL SYSTEM, AND VEHICLE CONTROL METHOD

(71) Applicant: Hitachi Astemo, Ltd., Hitachinaka (JP)

(72) Inventor: Keiichiro Nagatsuka, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 128 days.

(21) Appl. No.: 18/563,751

(22) PCT Filed: Feb. 2, 2022

(86) PCT No.: PCT/JP2022/003963
§ 371 (c)(1),
(2) Date: Nov. 22, 2023

(87) PCT Pub. No.: WO2022/249548
PCT Pub. Date: Dec. 1, 2022

(65) Prior Publication Data
US 2024/0282196 A1  Aug. 22, 2024

(30) Foreign Application Priority Data
May 28, 2021 (JP) .................................. 2021-089881

(51) Int. Cl.
*G08G 1/16* (2006.01)
*B60W 30/08* (2012.01)
*B60W 50/14* (2020.01)

(52) U.S. Cl.
CPC .............. *G08G 1/16* (2013.01); *B60W 30/08* (2013.01); *B60W 50/14* (2013.01);
(Continued)

(58) Field of Classification Search
CPC .... G08G 1/16; G08G 1/096783; G08G 1/166; B60W 30/08; B60W 50/14;
(Continued)

(56) References Cited

U.S. PATENT DOCUMENTS 10,553,115 B1 * 2/2020 Ismaili ................. G08G 1/0967
12,211,377 B2 * 1/2025 Inoue ....................... G08G 1/07
(Continued)

FOREIGN PATENT DOCUMENTS

CN     104537837 A      4/2015
JP     2014139832 A  *  7/2014
(Continued)

OTHER PUBLICATIONS

Shimizu Ryoichi, Apr. 3, 2014, English Machine Translation_ JP2014139832A provided by Patent Translate by EPO and Google (Year: 2014).*
(Continued)

*Primary Examiner* — Ashley L Redhead, Jr.
(74) *Attorney, Agent, or Firm* — Foley & Lardner LLP

(57) ABSTRACT

Provided is a vehicle drive control device capable of appropriately determining a signal state of a traffic signal and, in a case where there is a collision possibility with another object, suitably determining a warning to an own vehicle driver and/or vehicle control of the own vehicle in consideration of a signal information determination result. A vehicle drive control device 100 includes a signal state determination unit 104 that acquires, a plurality of times over a predetermined time, signal recognition information recognized by a signal information recognition unit 101 and determines a state of a signal based on the acquired signal recognition information, and a collision determination unit 107 that determines a possibility of collision between an own vehicle 10 and an other vehicle 20 based on information on the other vehicle 20 around the own vehicle recognized by an other vehicle recognition unit 102. When determining that there is a possibility of collision between the own vehicle 10 and the other vehicle 20, the collision determination unit 107 performs a warning to the driver of the own
(Continued)

vehicle 10 and/or vehicle control of the own vehicle 10 based on a signal state determination result of the signal state determination unit 104.

12 Claims, 8 Drawing Sheets

(52) U.S. Cl.
CPC ............... *B60W 2420/403* (2013.01); *B60W 2520/10* (2013.01); *B60W 2552/53* (2020.02); *B60W 2554/802* (2020.02); *B60W 2555/60* (2020.02)

(58) Field of Classification Search
CPC ....... B60W 2420/403; B60W 2520/10; B60W 2552/53; B60W 2554/802; B60W 2555/60; B60W 2050/143; B60W 2050/146; B60W 30/0953; B60W 30/18154; B60W 40/02; G06V 20/58
See application file for complete search history.

(56) References Cited

U.S. PATENT DOCUMENTS

| | | | |
|---|---|---|---|
| 2019/0176816 | A1 | 6/2019 | Sakamoto |
| 2019/0291729 | A1 | 9/2019 | Kamiya et al. |
| 2019/0329763 | A1* | 10/2019 | Sierra Gonzalez ......................... B60W 30/0956 |

FOREIGN PATENT DOCUMENTS

| | | | |
|---|---|---|---|
| JP | 2018-095097 A | | 6/2018 |
| JP | 2019-106050 A | | 6/2019 |
| JP | 2020074233 A | * | 5/2020 |

OTHER PUBLICATIONS

Kuroda Tatsumi, Jan. 31, 2018, English Machine Translation_ JP2020074233A provided by Patent Translate by EPO and Google (Year: 2018).*

International Search Report with English Translation of International Patent Application No. PCT/JP2022/003963 dated Apr. 19, 2022 (5 pages).

* cited by examiner

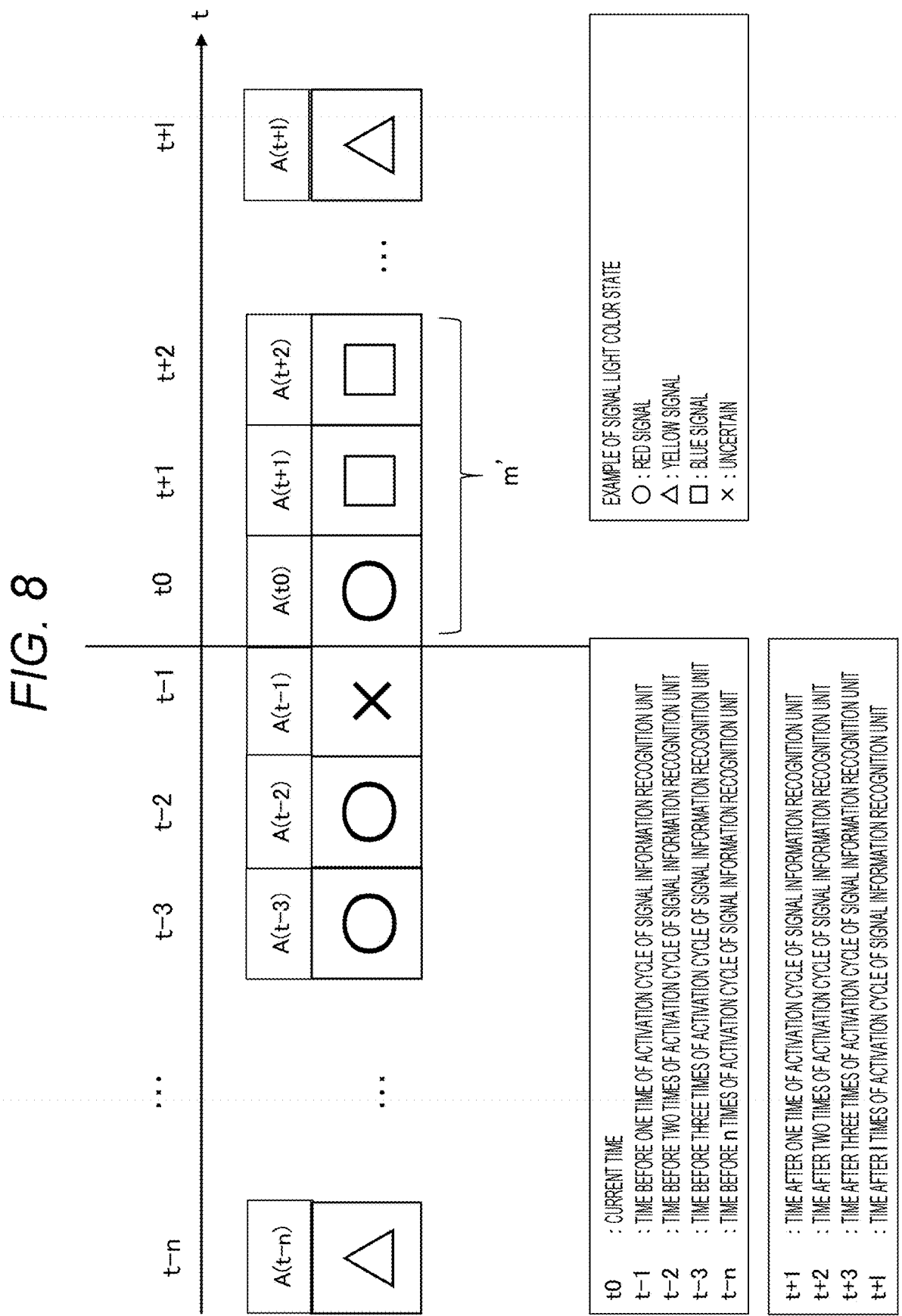

VEHICLE DRIVE CONTROL DEVICE, VEHICLE CONTROL SYSTEM, AND VEHICLE CONTROL METHOD

TECHNICAL FIELD

The present invention relates to a vehicle drive control device, and more particularly to a vehicle drive control device, a vehicle control system, and a vehicle control method that provide driving assistance at an intersection with a traffic signal.

BACKGROUND ART

Recently, there is a greatly growing interest in automobile safety technology. In response to this, various preventive safety systems have been put into practical use mainly by automobile-related companies and the like. These preventive safety systems also include a function of utilizing signal information of the traffic signal.

For example, PTL 1 discloses a driving support device including: a peripheral object recognition part for recognizing a peripheral object around a host vehicle; a signal recognition part for recognizing a light color state of a traffic signal in front of the host vehicle; and a support part for supporting driving of the host vehicle based on the recognition result of the peripheral object recognition part and the signal recognition part. PTL 1 discloses a technique in which the support part determines whether or not there is a possibility that the host vehicle contacts the peripheral object if the host vehicle travels to one or more specific directions where the light color state is red in a state of prohibiting travel to the specific directions at the intersection of a traffic signal, and the support part calculates a departure course candidate in which the host vehicle leaves the intersection without contacting the peripheral object in a case where determining that there is a possibility of contact with the peripheral object.

PTL 2 discloses a brake support device in a vehicle, the brake support device including: target detection parts for detecting a target; a cross point entry determination part for determining entry of an own vehicle to a cross point; and a brake support execution part for executing brake support by the brake device for avoiding or reducing collision with the target, the brake support execution part determining a traffic environment in a cross point using a detection result by the target detection parts when entry of the own vehicle to the cross point is determined, and controls execution of brake support according to the determined traffic environment.

CITATION LIST

Patent Literature

PTL 1: JP 2019-106050 A
PTL 2: JP 2018-95097 A

SUMMARY OF INVENTION

Technical Problem

However, in the techniques disclosed in PTL 1 and PTL 2, switching of signal information of the traffic signal is not sufficiently considered, and it is difficult to sufficiently secure reliability, safety, and practicality as a system.

Therefore, the present invention provides a vehicle drive control device, a vehicle control system, and a vehicle control method capable of appropriately determining a signal state of a traffic signal and, in a case where there is a collision possibility with another object, suitably determining a warning to an own vehicle driver and/or vehicle control of the own vehicle in consideration of a signal information determination result.

Solution to Problem

In order to solve the above problems, a vehicle drive control device according to the present invention includes: a signal state determination unit that acquires, a plurality of times over a predetermined time, signal recognition information recognized by a signal information recognition unit, and determines a state of a signal based on the acquired signal recognition information; and a collision determination unit that determines a possibility of collision between an own vehicle and another vehicle based on information on the other vehicle around an own vehicle recognized by an other vehicle recognition unit, in which when determining that there is the possibility of collision between the own vehicle and the other vehicle, the collision determination unit performs a warning to a driver of the own vehicle and/or vehicle control of the own vehicle based on a signal state determination result of the signal state determination unit.

A vehicle control system according to the present invention includes: a signal information recognition unit that recognizes information on a signal; an other vehicle recognition unit that recognizes another vehicle around an own vehicle; a signal state determination unit that acquires, a plurality of times over a predetermined time, signal recognition information recognized by the signal information recognition unit, and determines a state of the signal based on acquired signal recognition information; and a collision determination unit that determines a possibility of collision between an own vehicle and an other vehicle based on information on the other vehicle around an own vehicle recognized by the other vehicle recognition unit, in which when determining that there is the possibility of collision between the own vehicle and the other vehicle, the collision determination unit performs a warning to a driver of the own vehicle and/or vehicle control of the own vehicle based on a signal state determination result of the signal state determination unit.

In a vehicle control method according to the present invention, a signal state determination unit acquires, a plurality of times over a predetermined time, signal recognition information recognized by a signal information recognition unit, and determines a state of a signal based on acquired signal recognition information, a collision determination unit determines a possibility of collision between an own vehicle and an other vehicle based on information on the other vehicle around an own vehicle recognized by an other vehicle recognition unit, and when determining that there is the possibility of collision between the own vehicle and the other vehicle, the collision determination unit performs a warning to a driver of the own vehicle and/or vehicle control of the own vehicle based on a signal state determination result of the signal state determination unit.

Advantageous Effects of Invention

According to the present invention, it is possible to provide a vehicle drive control device, a vehicle control system, and a vehicle control method capable of appropriately determining a signal state of a traffic signal and, in a case where there is a collision possibility with another object, suitably determining a warning to an own vehicle driver and/or vehicle control of the own vehicle in consideration of a signal information determination result. Problems, configurations, and effects other than those described above will be made clear by the description of the following embodiment.

BRIEF DESCRIPTION OF DRAWINGS

FIG. 8 is a view illustrating an example of signal state determination processing in the vehicle drive control device constituting the vehicle control system according to Example 2.

DESCRIPTION OF EMBODIMENTS

Examples of the present invention will be described below with reference to the drawings.

Example 1

Figure 5:
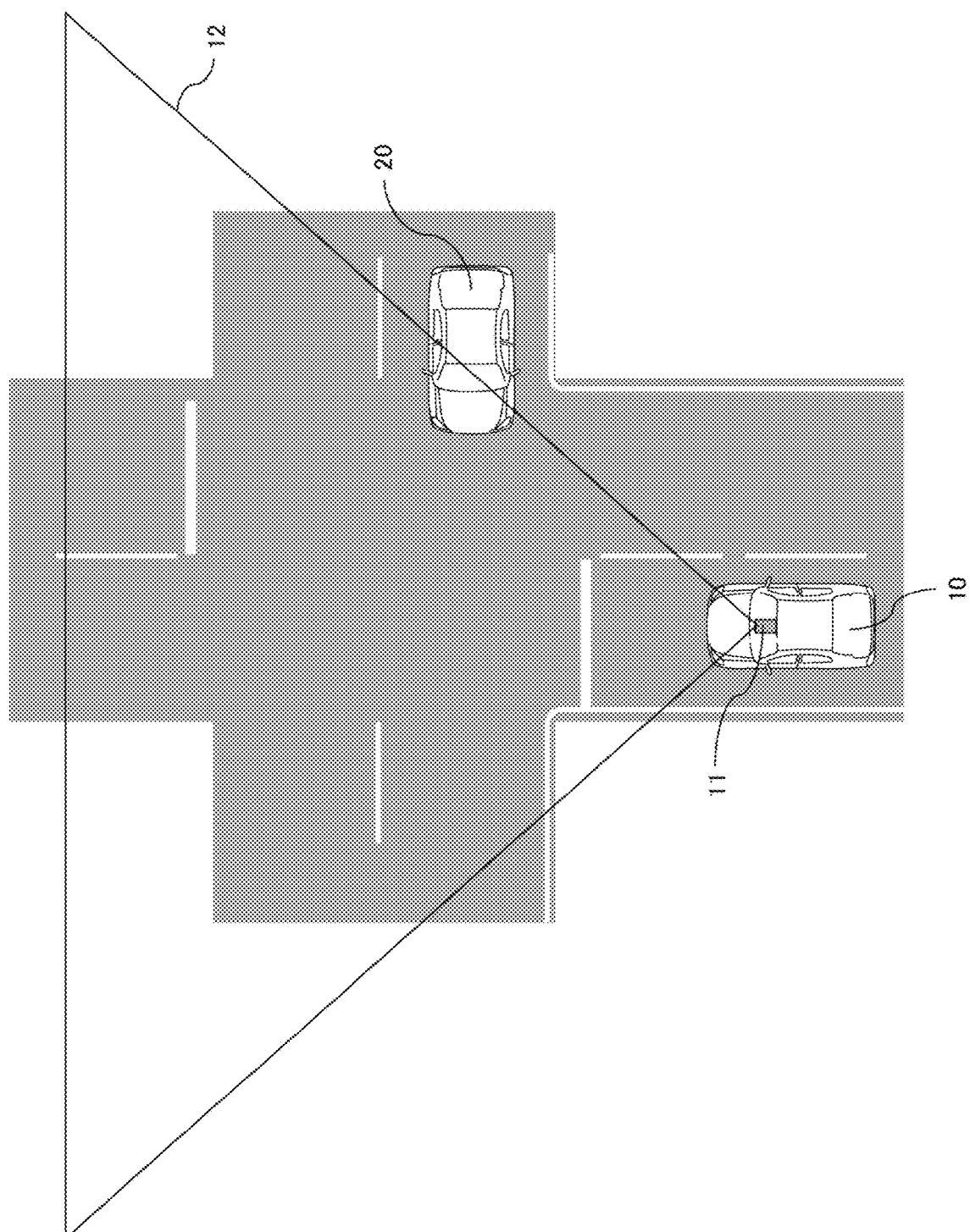
FIG. 5 is a bird's-eye view illustrating an example of a case where a vehicle mounted with a known collision damage reduction system is present at an intersection without a traffic signal.

FIG. 5 is a bird's-eye view illustrating an example of a case where a vehicle mounted with a known collision damage reduction system is present at an intersection without a traffic signal. FIG. 5 illustrates a scenario in which another vehicle 20 approaches an own vehicle travel path from the side when an own vehicle 10 mounted with an in-vehicle periphery recognition sensor 11 and a known drive control device drives. Since the other vehicle 20 is within a recognition range 12 of the in-vehicle periphery recognition sensor, the in-vehicle periphery recognition sensor 11 and the known drive control device determine a collision possibility based on travel path estimation of the own vehicle 10 and travel path estimation of the other vehicle 20. There is known a collision damage reduction system that performs deceleration control and the like of the own vehicle 10 for collision damage reduction or collision avoidance when it is determined that there is a collision possibility.

Figure 6:
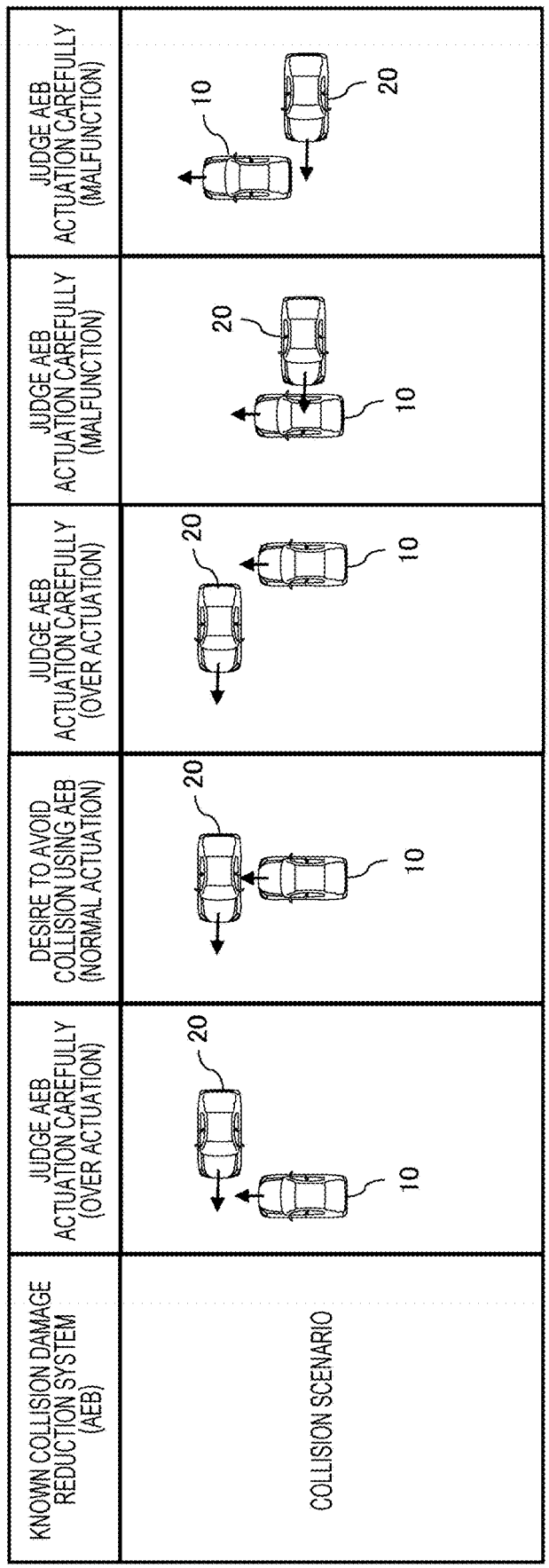
FIG. 6 is a view illustrating an example of a collision scenario and a system actuation range in a known collision damage reduction system.

FIG. 6 is a view illustrating an example of a collision scenario and a system actuation range in a known collision damage reduction system. In a system aiming at reducing collision damage occurring in particular at an intersection or the like, it is necessary to appropriately estimate the travel path of the other vehicle 20 in addition to a technical difficulty in travel path estimation of the own vehicle 10. FIG. 6 illustrates classification of a collision scenario to occur based on each travel path estimation. That is, the collision scenario can be classified into a collision scenario in which there is a possibility of collision between the front surface of the own vehicle 10 and the vicinity of the front end of the side surface of the other vehicle 20, a collision scenario in which there is the possibility of collision between the front surface of the own vehicle 10 and the vicinity of the center of the side surface of the other vehicle 20, a collision scenario in which there is a possibility that the other vehicle 20 collides with the vicinity of the rear end of the side surface of the own vehicle 10 from the front surface, a collision scenario in which there is a possibility that the other vehicle 20 collides with the side surface of the own vehicle 10 from the front surface, and a collision scenario in which there is a possibility that the front surface of the other vehicle 20 collides with the rear end of the side surface of the own vehicle 10. Among these, the collision scenario in which there is a possibility of collision between the front surface of the own vehicle 10 and the vicinity of the center of the side surface of the other vehicle 20 is a scenario in which it becomes important to actuate a collision damage reduction brake even in consideration the fact that the travel path estimation result of the own vehicle 10 and the travel path estimation result of the other vehicle 20 each include an error. In other scenarios, since there is a concern of excessive actuation or malfunction, it is necessary to carefully select the actuation scenario, and it is difficult to say that the function of the collision damage reduction brake can be sufficiently applied.

Figure 1:
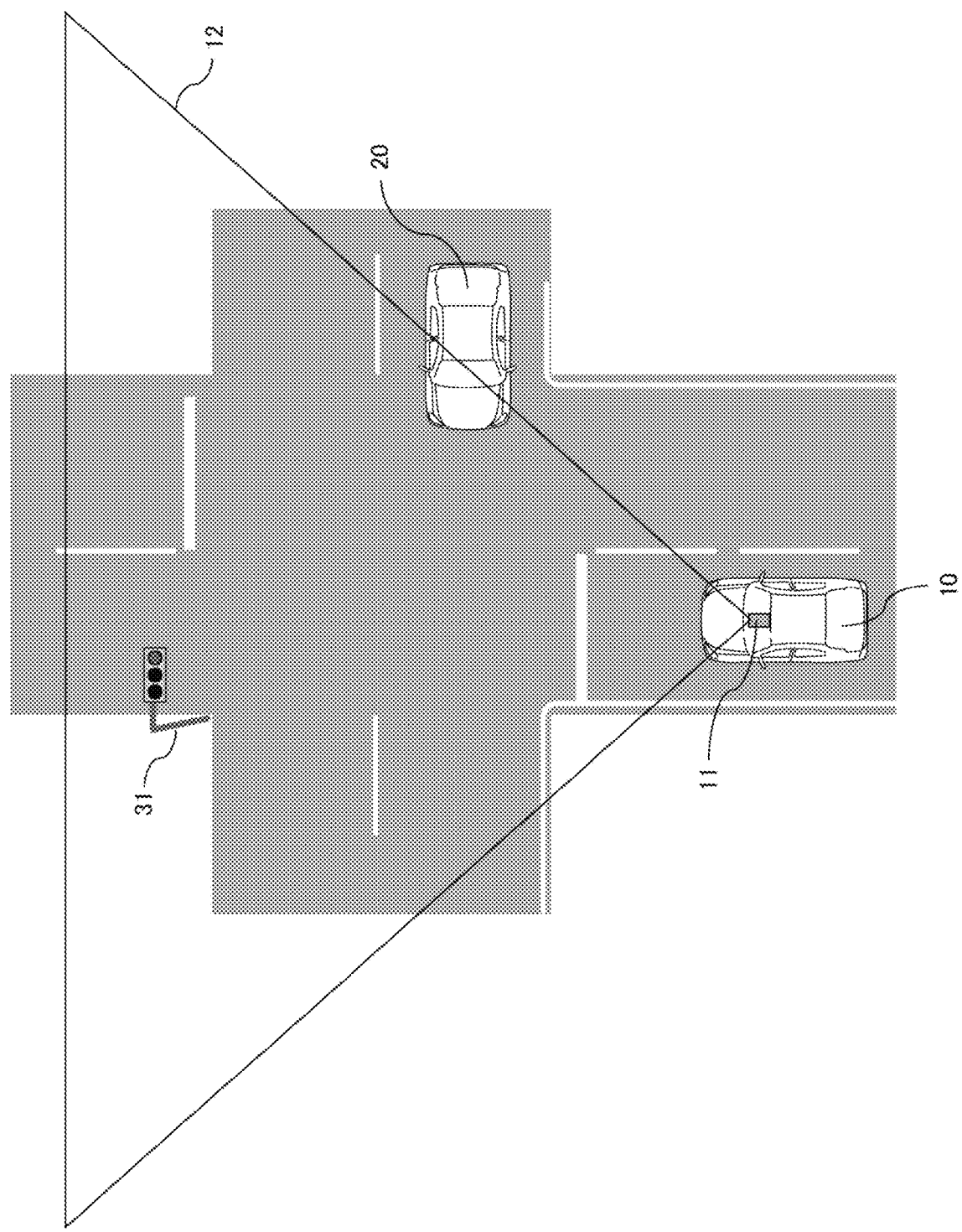
FIG. 1 is a bird's-eye view illustrating an example of a case where a vehicle mounted with a vehicle control system of Example 1 according to an example of the present invention is present at an intersection with a traffic signal.

FIG. 1 is a bird's-eye view illustrating an example of a case where a vehicle mounted with the vehicle control system of Example 1 according to an example of the present invention is present at an intersection with a traffic signal. The difference from the bird's-eye view illustrated in FIG. 5 is whether or not there is a traffic signal. As described above, among the collision scenarios at the intersection, the scenario in which the collision damage reduction brake can be actuated is limited, but, by appropriately recognizing and determining the light color of the traffic signal at the intersection with a traffic signal 31 as illustrated in FIG. 1, the collision damage reduction brake can be actuated in a wider collision scenario by accurately determining the possibility of entering the intersection of the red signal due to inattention of the driver of the own vehicle 10 or the like in addition to determination of the possibility of collision with the other vehicle 20.

[Overall Configuration of Vehicle Control System]

Figure 2:
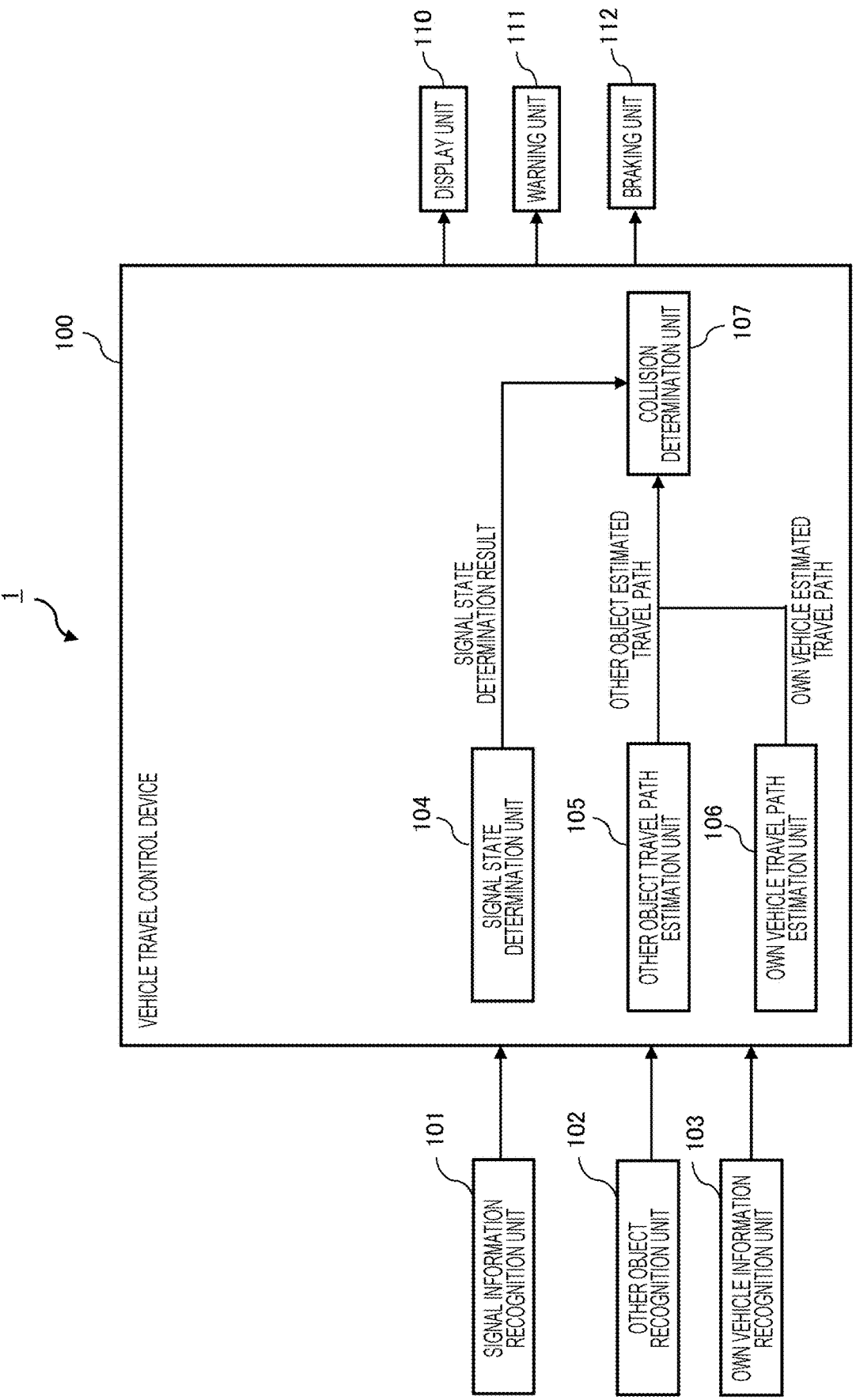
FIG. 2 is a functional block diagram illustrating an overall configuration example of the vehicle control system according to Example 1.

FIG. 2 is a functional block diagram illustrating an overall configuration example of the vehicle control system according to Example 1. As illustrated in FIG. 2, a vehicle control system 1 includes a signal information recognition unit 101, an other object recognition unit 102, an own vehicle information recognition unit 103, a vehicle drive control device 100, a display unit 110, a warning unit 111, and a braking unit 112.

The signal information recognition unit 101 detects a light color state of a signal (traffic signal 31) present in front of the own vehicle 10 or a distance, an angle, and the like to the traffic signal 31, and transmits the result thereof to the vehicle drive control device 100 as another object recognition another result (including vehicle recognition result). Specifically, the signal information recognition unit 101 includes a stereo camera or a monocular camera. The signal information recognition unit 101 also includes an image processing function not illustrated.

The other object recognition unit 102 detects a distance, a relative speed, an angle, and the like with respect to a vehicle, a person, an object, and the like present in front of the own vehicle 10, and transmits the result thereof to the vehicle drive control device 100. Specifically, the other object recognition unit 102 includes a stereo camera or a monocular camera. The other object recognition unit 102 also includes an image processing function not illustrated.

The own vehicle information recognition unit 103 collects and transmits, to the vehicle drive control device 100, information on behavior of the own vehicle 10 such as own vehicle speed, yaw rate, the longitudinal acceleration, and lateral acceleration, and operation information of the driver such as accelerator opening, brake depression amount, and steering angle.

The display unit 110 has a function of providing display information to the driver as a result of calculation by the vehicle drive control device 100 described later. For example, the display unit 110 is achieved by a meter or a head-up display unit (HUD unit).

The warning unit 111 has a function of providing a warning to the driver as a result of calculation by the vehicle drive control device 100 described later. For example, the warning unit 111 is achieved by a speaker.

The braking unit 112 has a function of braking the own vehicle 10 in response to a braking command to the own vehicle 10 as a result of calculation by the vehicle drive control device 100 described later. For example, the braking unit 112 is achieved by a mechanism such as a pump that discharges a high-pressure brake fluid and an electromagnetic valve for supplying the brake fluid to a wheel cylinder of each wheel while adjusting the pressure of the brake fluid. A vehicle mounted with an electric motor system can be decelerated by regeneration.

Note that the signal information recognition unit 101, the other object recognition unit 102, and the own vehicle information recognition unit 103 described above only need to be able to collect minimum necessary information for each vehicle control algorithm described later, and can be arranged (mounted) in the vehicle drive control device 100 described later according to the necessity. The vehicle drive control device 100 is desirably implemented on an electronic control unit (ECU) including a ROM for storing programs of a plurality of vehicle control algorithms described later, a CPU for executing various arithmetic processing, and a RAM for storing arithmetic results.

[Configuration of Vehicle Drive Control Device]

As illustrated in FIG. 2, the vehicle drive control device 100 includes a signal state determination unit 104, an other object travel path estimation unit 105, an own vehicle travel path estimation unit 106, and a collision determination unit 107. Here, the signal state determination unit 104, the other object travel path estimation unit 105, the own vehicle travel path estimation unit 106, and the collision determination unit 107 are achieved by, for example, a processor such as a CPU not illustrated, a ROM that stores various programs, a RAM that temporarily enables data in an arithmetic process, and a storage device such as an external storage device, and the processor such as a CPU reads and executes the various programs stored in the ROM, and stores the arithmetic result that is an execution result in the RAM or the external storage device.

The signal state determination unit 104 calculates a signal state determination result based on the light color state (sometimes simply referred to as signal information) of the signal (traffic signal 31) present in front of the own vehicle 10 received from the signal information recognition unit 101, and transmits (outputs) the calculated signal state determination result to the collision determination unit 107.

The other object travel path estimation unit 105 calculates an other object estimated travel path (other vehicle estimated travel path) based on the distance, the relative speed, the angle, and the like with respect to the vehicle, the person, the object, and the like present in front of the own vehicle 10 received from the other object recognition unit 102. The other object travel path estimation unit 105 transmits (outputs) the calculated other object estimated travel path (other vehicle estimated travel path) to the collision determination unit 107.

The own vehicle travel path estimation unit 106 calculates and transmits (outputs), to the collision determination unit 107, an own vehicle estimated travel path based on at least the own vehicle speed, the yaw rate, and the steering angle received from the own vehicle information recognition unit 103.

The collision determination unit 107 executes collision possibility determination processing based on the signal state determination result received from the signal state determination unit 104, the other object estimated travel path (other vehicle estimated travel path) received from the other object travel path estimation unit 105, and the own vehicle estimated travel path received from the own vehicle travel path estimation unit 106. When determining that there is a possibility of collision between the own vehicle 10 and the other vehicle 20, the collision determination unit 107 calculates a display command value for notifying the driver of a risk of collision, a warning command value for notifying the driver of a risk of collision, and a braking command value for collision damage reduction or collision avoidance. Then, the collision determination unit 107 transmits the calculated display command value to the display unit 110, the calculated warning command value to the warning unit 111, and the calculated braking command value to the braking unit 112. Note that the collision determination unit 107 may be referred to as collision possibility estimation unit, and is not limited to the configuration where the calculated display command value described above is transmitted to the display unit 110, the calculated warning command value is transmitted to the warning unit 111, and the calculated braking command value is transmitted to the braking unit 112. That is, the collision determination unit 107 may be configured to execute at least one of transmission of the calculated display command value to the display unit 110, transmission of the calculated warning command value to the warning unit 111, and transmission of the calculated braking command value to the braking unit 112. In other words, the collision determination unit 107 (collision possibility estimation unit) executes a warning to the driver of the own vehicle 10 and/or vehicle control of the own vehicle 10.

Note that the present example assumes that the signal information recognition unit 101, the other object recognition unit 102, the own vehicle information recognition unit 103, the vehicle drive control device 100, the display unit 110, the warning unit 111, and the braking unit 112 use a controller area network (CAN) generally used as an in-vehicle network for transmission of each piece of information, but the present invention is not limited to this. For example, Ethernet or the like may be used.

[Processing Flow of Vehicle Drive Control Device]

Figure 3:
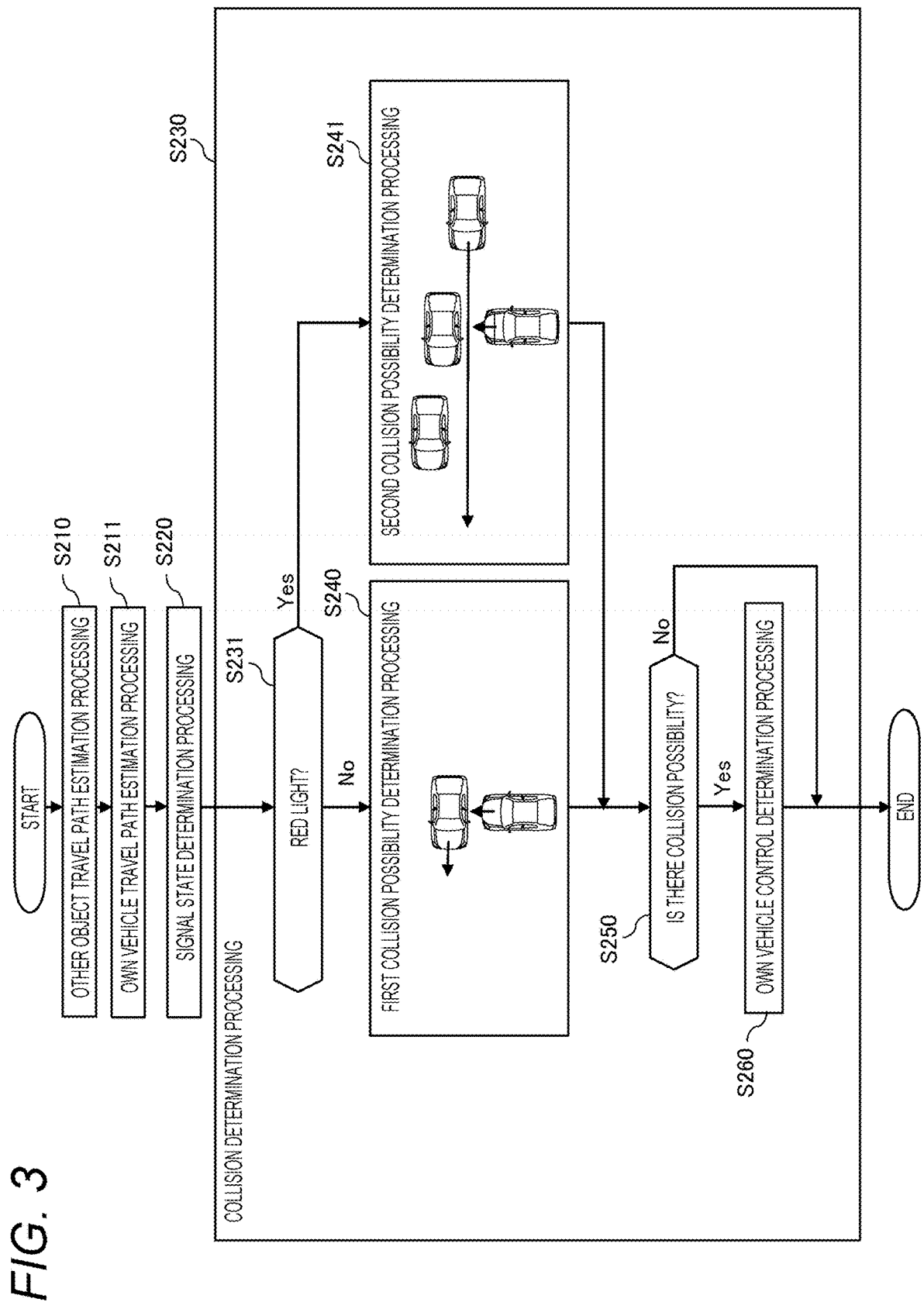
FIG. 3 is a flowchart showing a processing operation of a vehicle drive control device constituting the vehicle control system according to Example 1.

Next, a specific processing operation of the vehicle drive control device 100 according to the present example will be described below. FIG. 3 is a flowchart showing a processing operation of the vehicle drive control device 100 constituting the vehicle control system 1 according to the present example. The processing flow shown in FIG. 3 is repeatedly executed at predetermined time intervals.

When the routine is activated, first, other object travel path estimation processing in step S210 is executed. That is, in step S210, the other object travel path estimation unit 105 constituting the vehicle drive control device 100 calculates an other object estimated travel path (other vehicle estimated travel path) based on the distance, the relative speed, the angle, and the like with respect to the vehicle, the person, the object, and the like present in front of the own vehicle 10 detected by the other object recognition unit 102.

Next, own vehicle travel path estimation processing in step S211 is executed. In step S211, the own vehicle travel path estimation unit 106 constituting the vehicle drive control device 100 calculates the own vehicle estimated travel path based on the own vehicle speed, the yaw rate, and the steering angle received from the own vehicle information recognition unit 103. In addition, a preset parameter (steer gear ratio or the like) of the own vehicle 10 is often used to calculate the own vehicle estimated travel path.

Next, signal state determination processing in S220 is executed. In step S220, the signal state determination unit 104 constituting the vehicle drive control device 100 calculates a signal state determination result based on the light color state of the signal (traffic signal 31) present in front of the own vehicle 10 received from the signal information recognition unit 101. Note that the execution order of steps S210 to S220 described above can be changed.

Next, collision determination processing in step S230 is executed. The present processing includes a plurality of processing and will be described below.

First, in step S231, the signal state determination unit 104 constituting the vehicle drive control device 100 determines whether or not the signal state determination result is a red signal. If the determination result is not the red signal, first collision possibility determination processing in step S240 is executed. On the other hand, if the determination result is the red signal, second collision possibility determination processing in step S241 is executed. Similarly to the known collision damage reduction system, the first collision possibility determination processing in step S240 determines that there is a collision possibility when it is determined that the front surface of the own vehicle 10 collides with the vicinity of the center of the side surface of the other vehicle 20 based on the other object estimated travel path (other vehicle estimated travel path) and the own vehicle estimated travel path. The second collision possibility determination processing in step S241 similarly determines a possibility of collision based on the other object estimated travel path (other vehicle estimated travel path) and the own vehicle estimated travel path, but determines that there is a collision possibility for a wider collision scenario as compared with that of the known collision damage reduction system. That is, the second collision possibility determination processing can determine that the own vehicle 10 is about to enter the intersection ignoring the red signal. Therefore, in a case where there is a possibility of collision between the front surface of the own vehicle 10 and the vicinity of the front end of the side surface of the other vehicle 20, in a case where there it is determined that the front surface of the own vehicle 10 and the vicinity of the center of the side surface of the other vehicle 20 collide, or in a case where there is the possibility of collision between the front surface of the own vehicle 10 and the vicinity of the rear end of the side surface of the other vehicle 20, it can be determined that there is a collision possibility. Also in a case where there is a possibility that the other vehicle 20 collides with the side surface of the own vehicle 10 from the front surface, and in a case where there is a possibility that the front surface of the other vehicle 20 collides with the rear end of the side surface of the own vehicle 10, it can be determined that the own vehicle 10 is about to enter the intersection ignoring the red signal, and thus the collision possibility can be determined.

Note that in the present example, an example has been described in which the processing is divided into the first collision possibility determination processing and the second collision possibility determination processing depending on the determination result of the signal state and executed, but the present invention is not limited to this. For example, the parameter related to a collision possibility determination threshold in the collision possibility determination processing may be changed depending on the determination result of the signal state. Also in this case, the same effect can be obtained. Note that as an example of changing the parameter related to the collision possibility determination threshold in the collision possibility determination processing described above, the arithmetic range of time to collision (TTC) calculated for collision possibility determination is changed depending on the determination result of the signal state. Specifically, when it is determined that the own vehicle 10 is about to enter the intersection ignoring the red signal, the TTC arithmetic range is expanded. That is, a risk of collision is determined with a collision possibility determination region (TTC arithmetic range) at the four corners of the own vehicle 10 and in a certain range of front, rear, left, and right expanded from the respective positions. Here, the time to collision (TTC) means calculating a time to collision mainly based on an own vehicle travel route estimated value (own vehicle estimated travel path) at the center of the front surface of the own vehicle 10 and a travel route estimated value (other vehicle estimated travel path) of the other vehicle 20.

Next, in step S250, the signal state determination unit 104 constituting the vehicle drive control device 100 determines (confirms) whether or not the collision possibility determination result is a possibility of collision. When the result of the determination is not collision possibility (when there is no collision possibility), the present routine is ended as it is. On the other hand, when the result of the determination is collision possibility, the process proceeds to step S260.

In step S260, the signal state determination unit 104 constituting the vehicle drive control device 100 executes the own vehicle control determination processing, and calculates a display command value for notifying the driver of a risk of collision, a warning command value for notifying the driver of a risk of collision, and a braking command value for collision damage reduction or collision avoidance.

[Details of Signal State Determination Processing]

Figure 4:
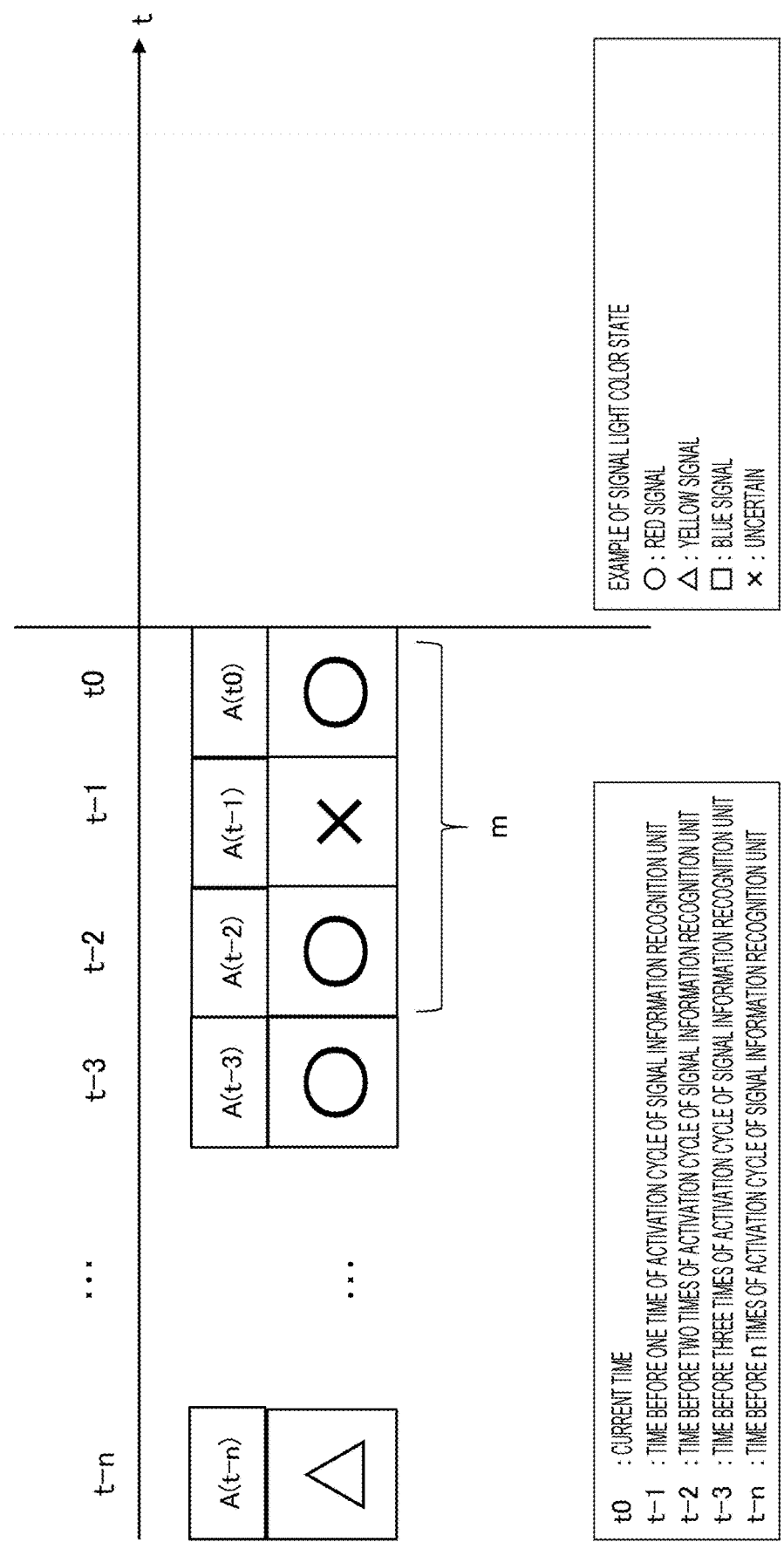
FIG. 4 is a view illustrating an example of signal state determination processing in the vehicle drive control device constituting the vehicle control system according to Example 1.

FIG. 4 is a view illustrating an example of signal state determination processing in the vehicle drive control device constituting the vehicle control system according to Example 1. FIG. 4 illustrates an example in which current signal information (light color state of the signal) is detected by a camera such as a stereo camera or a monocular camera constituting the signal information recognition unit 101. Specifically, it is a view for explaining the content of the signal state determination processing in step S220 (see FIG. 3) described above.

The characteristic of the signal information is that the light color of the signal is cyclically switched. This cycle is not always a constant cycle, and changes depending on traffic conditions for each intersection and hours. Furthermore, in a case where recognition information of a signal is acquired by a stereo camera or a monocular camera, which is an in-vehicle autonomous sensor, it is not always possible to detect a correct light color, and therefore, it is desirable to determine the current signal state in consideration of information of the signal information recognition unit 101 within a past predetermined time.

The light color information of the signal detected by the signal information recognition unit 101 constituting the vehicle control system 1 described above is information on recognition of the light color of the signal at current time t0. The signal state determination processing of step S220 first executes processing of storing the light color information of the signal received from the signal information recognition unit 101 into a signal information storage array A(t). Note that the signal information storage array A(t) is stored in a storage unit not illustrated in the vehicle drive control device 100. The signal information received at the current time t0 is stored in A(t0). Before the current time information is stored, the signal information at time t0−1 before one time of activation cycle of the signal information recognition unit 101, that is, the last value is shifted to A(t−1) and stored. Similarly, the signal information at time t0−2 before two times of activation cycle of the signal information recognition unit 101 is stored in A(t−2) in advance. Note that the activation cycle of the signal information recognition unit 101 will be described later. In the present example, for convenience of the description, handling of past signal information from storage of current time signal information has been described, but it should be noted that, in general, in a case of implementation as an algorithm, a method of sequentially shifting past values from signal information on A(t−n) side is adopted.

Next, for the signal information stored in the signal information storage array A(t), confirmation processing of the signal information for the number of times (m) of signal information confirmation is performed from the signal information A(t0) received at the current time t0. It is determined whether the signal information stored in the signal information storage array A(t) is in a predetermined signal state (Tgt_Signal_Status), and when the stored signal information is equal to the predetermined signal state, the number of times is recorded in the number of times (True_count) of signal information confirmation.

Next, in a case where this number of times (True_count) of signal information confirmation is equal to or greater than a preset signal information confirmation determination threshold (True_Threshold), the number of times (True_count) of signal information confirmation is the signal state determination result at the current time t0. An example of the program language is as shown in Table 1 below.

TABLE 1

| Input | Output |
|---|---|
| Condition determination | Number of times (True_count) of signal information confirmation |
| (for i = 0, i < m, i++) A (t − i) == Predetermined signal state (Tgt_Signal_Status) | True_count++ (Increment) |
| Other than above | (Nothing is done) |

The example of FIG. 4 presents a state where the signal information storage array A(t) stores "◯", which represents red signal, for the signal information A(t0) received at the current time t0, "x", which represents that the light color state of the signal cannot be determined for some reason, for the signal information A(t−1) at the time t0−1 before one time of activation cycle of the signal information recognition unit 101, and "◯", which represents red signal, for the signal information A(t−2) at the time t0−2 before two times of activation cycle of the signal information recognition unit 101.

In a case where the number of times (m) of signal information confirmation is three times, the predetermined signal state (Tgt_Signal_Status) is the red signal "◯", and the signal information confirmation determination threshold (True_Threshold) is two times, it is determined that the signal state (Signal_Status) is the red signal "◯".

In a case where the number of times (m) of signal information confirmation is three times, the predetermined signal state (Tgt_Signal_Status) is the red signal "◯", and the signal information confirmation determination threshold (True_Threshold) is three times, it is determined that the signal state (Signal_Status) is uncertain "x". Note that in the present example, for simplification of the description, the signal state (Signal_Status) has been described using symbols (◯△□x), but it is more desirable to determine the signal state based on a relationship between status information of a predetermined signal and a numeral.

Note that the signal information storage array A(t) may be set to a preset fixed array length, or the array length may be changed depending on the own vehicle speed.

The number of times (m) of signal information confirmation and the signal information confirmation determination threshold (True_Threshold) can be set to preset fixed values or can be changed depending on the own vehicle speed. In particular, in a case where the own vehicle enters an intersection with a traffic signal in a state where the own vehicle speed is high, if the number of times (m) of signal information confirmation and the signal information confirmation determination threshold (True_Threshold) are set to be large, there is a case of setting where it is impossible to determine whether to be substantially a desired signal state due to the relationship between the maximum distance at which the signal information can be recognized by the camera and a signal information recognition processing cycle (activation cycle of the signal information recognition unit 101). For setting of a parameter, a signal information recognition distance by the camera and the signal information recognition processing cycle (activation cycle of the signal information recognition unit 101) become important, and on an assumption that the signal information recognition distance is about 100 m and the signal information recognition processing cycle (activation cycle of the signal information recognition unit 101) is 100 ms, and on an assumption that the signal information determination result is updated every time the own vehicle 10 travels 10 m, it is desirable to set the number of times (m) of signal information confirmation to 6 times and the signal information confirmation determination threshold (True_Threshold) to about 3 times in a case where the own vehicle speed is equal to or less than 60 km/h. The present example has been described with an example of the case where the signal information recognition processing cycle (activation cycle of the signal information recognition unit 101) is set to 100 ms, but the present invention is not limited to this. For example, a desired cycle may be appropriately set such as setting the signal information recognition processing cycle (activation cycle of the signal information recognition unit 101) to 50 ms. If the signal information recognition processing cycle (activation cycle of the signal information recognition unit 101) is set to 50 ms, the number of times (m) of signal information confirmation can be set to 12 times in the case where the own vehicle speed is equal to or less than 60 km/h.

In a case where the own vehicle speed is equal to or greater than 100 k/h, it is desirable to set the number of times (m) of signal information confirmation to 3 times, and the signal information confirmation determination threshold (True_Threshold) to about 2 times.

Here, the product of the signal information recognition processing cycle (activation cycle of the signal information recognition unit 101) multiplied by the number of times of signal information confirmation is time, and the signal state determination processing can be executed by the number of times of signal information confirmation within this time. In other words, the recognized signal information (signal recognition information) is acquired a plurality of times over a predetermined time.

In the present example, of the number of times (m) of signal information confirmation, the number of times the information stored in the signal information storage array A(t) is equal to the predetermined signal state is recorded as the number of times (True_count) of signal information confirmation to determine whether to be the predetermined signal state, but the determination may be performed based on whether to be continuously the predetermined signal state in order to further increase the reliability of the signal state determination.

In the present example, the array length of the signal information storage array A(t) is changed depending on the own vehicle speed. In other words, the example in which the predetermined time and/or the number of times of acquisition of the recognized signal information (signal recognition information) are/is changed depending on the own vehicle speed has been described, but the present invention is not limited to this. For example, the camera constituting the signal information recognition unit 101 images a road sign, a stop line, an intersection shape, and the like, and the road sign, the stop line, and the intersection shape are recognized by known image processing based on the imaged images. The number of times the signal information recognition unit 101 acquires the signal recognition information and/or the predetermined time the signal information recognition unit 101 acquires may be changed depending on the recognized road sign, the recognized stop line, and the distance to the recognized intersection (calculated based on the intersection shape).

As described above, according to the present example, it is possible to provide a vehicle drive control device, a vehicle control system, and a vehicle control method capable of appropriately determining a signal state of a traffic signal and, in a case where there is a collision possibility with another object, suitably determining a warning to an own vehicle driver and/or vehicle control of the own vehicle in consideration of a signal information determination result.

Example 2

Figure 7:
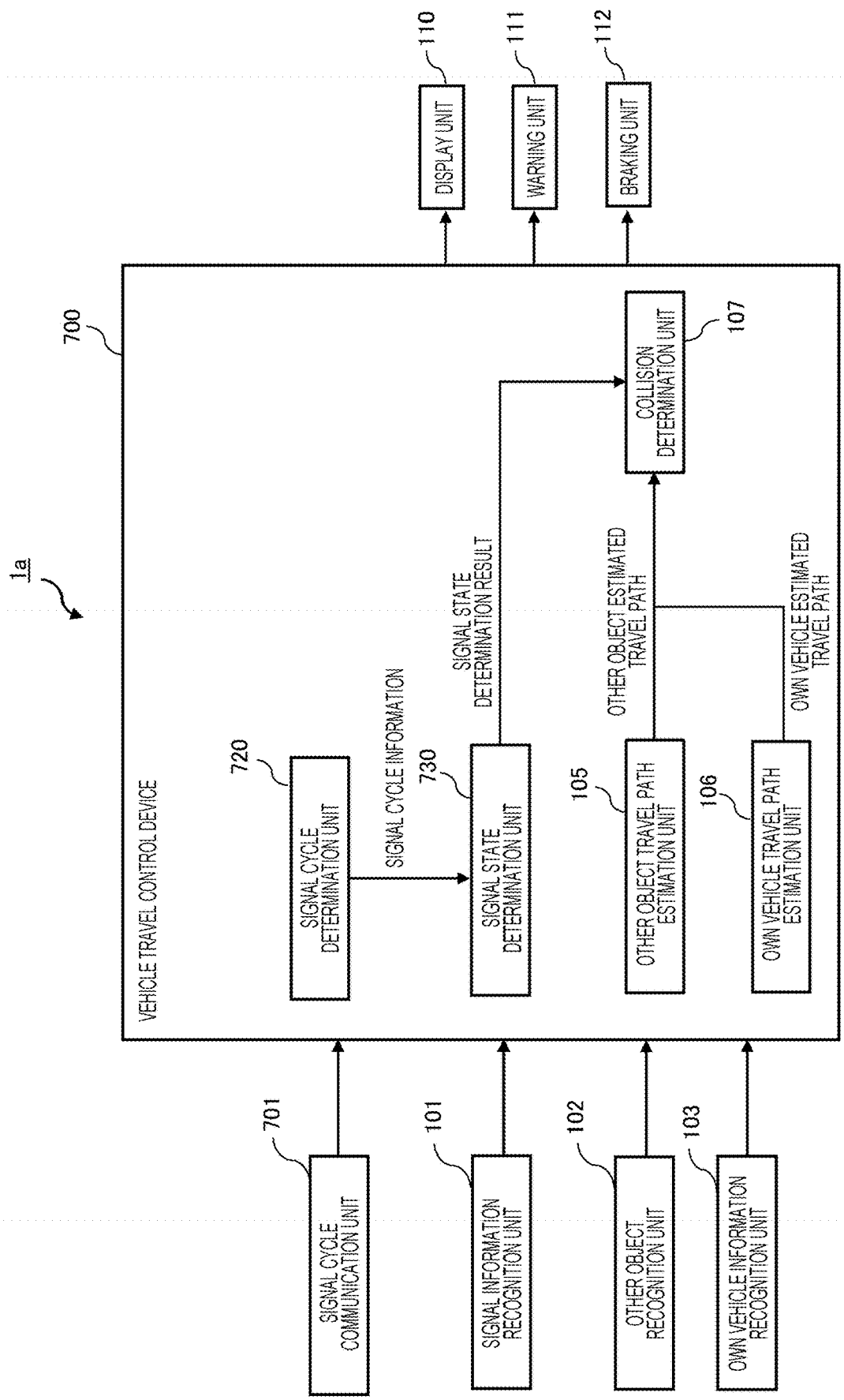
FIG. 7 is a functional block diagram illustrating an overall configuration example of a vehicle control system of Example 2 according to another example of the present invention.

FIG. 7 is a functional block diagram illustrating an overall configuration example of the vehicle control system of Example 2 according to another example of the present invention. A vehicle control system 1a according to the present example is different from that of Example 1 in providing a signal cycle communication unit 701 and, in a vehicle control device 700, a signal cycle determination unit 720 with respect to Example 1. The same components as those in Example 1 are denoted by the same reference signs, and the description overlapping those in Example 1 will be omitted below.

[Overall Configuration of Vehicle Control System]

As illustrated in FIG. 7, the vehicle control system 1a according to the present example includes the signal cycle communication unit 701, the signal information recognition unit 101, the other object recognition unit 102, the own vehicle information recognition unit 103, the vehicle drive control device 700, the display unit 110, the warning unit 111, and the braking unit 112.

The signal cycle communication unit 701 receives, in the vehicle via communication, light color signal cycle information of the traffic signal 31 transmitted from the traffic signal 31 having a communication function not illustrated, and transmits the light color signal cycle information to the vehicle drive control device 700. Specifically, a communication device such as vehicle to something (V2X) or vehicle to something (C2X) is suitable.

The signal cycle determination unit 720 constituting the vehicle drive control device 700 determines the content of the light color signal cycle information of the traffic signal 31 received from the signal cycle communication unit 701, and generates the content as information (signal cycle information) in a format used by a signal state determination unit 730. The signal cycle determination unit 720 transmits the generated signal cycle information to the signal state determination unit 730.

The signal state determination unit 730 determines the content of the signal cycle information (light color signal cycle information of the traffic signal 31) received from the signal cycle determination unit 720, and generates the content as information (signal state determination result) in a format used by the signal state determination unit 730. The signal state determination unit 730 transmits the generated signal state determination result to the collision determination unit 107. Here, the signal cycle determination unit 720, the signal state determination unit 730, the other object travel path estimation unit 105, the own vehicle travel path estimation unit 106, and the collision determination unit 107 are achieved by, for example, a processor such as a CPU not illustrated, a ROM that stores various programs, a RAM that temporarily enables data in an arithmetic process, and a storage device such as an external storage device, and the processor such as a CPU reads and executes the various programs stored in the ROM, and stores the arithmetic result that is an execution result in the RAM or the external storage device.

[Details of Signal State Determination Processing]

FIG. 8 is a view illustrating an example of signal state determination processing in the vehicle drive control device constituting the vehicle control system according to Example 2. A characteristic of the present example is that not only signal information at the current time point but also signal information in future can be acquired from the signal cycle communication unit 701.

The signal state determination unit 730 first executes processing of storing, into the signal information storage array A(t), the signal cycle information received from the signal cycle communication unit 701. Note that the signal information storage array A(t) is stored in a storage unit not illustrated in the vehicle drive control device 700. The signal information received at the current time t0 is stored in A(t0), and the information of the time after one time of activation cycle of the signal information recognition unit 101 is stored in A(t+1). Similarly, the after two times of activation cycle of the signal information recognition unit 101 is stored in A(t+2). Next, for the signal information stored in the signal information storage array A(t), confirmation processing of stored information for the number of times (m') of signal information confirmation is performed from A(t0), confirmation whether the stored information is in a predetermined signal state (Tgt_Signal_Status) is performed, and when the stored information is equal to the predetermined signal state, the number of times (True_count') is recorded.

Next, in a case where this number of times (True_count') of signal information confirmation is equal to or greater than a preset signal information confirmation threshold (True_Threshold'), the number of times (True_count') of signal information confirmation is the signal state determination result at the current time t0.

Note that the signal information storage array A(t), may be set to a preset fixed array length, or the array length may be changed depending on the own vehicle speed.

In the present example, the array length of the signal information storage array A(t) is changed depending on the own vehicle speed. In other words, although an example of changing the predetermined time and/or the number of times of acquisition of recognized signal information (signal recognition information) depending on the own vehicle speed has been described, the present invention is not limited to this. For example, the camera constituting the signal information recognition unit 101 images a road sign, a stop line, an intersection shape, and the like, and the road sign, the stop line, and the intersection shape are recognized by known image processing based on the imaged images. The number of times the signal information recognition unit 101 acquires the signal recognition information and/or the predetermined time the signal information recognition unit 101 acquires may be changed depending on the recognized road sign, the recognized stop line, and the distance to the recognized intersection (calculated based on the intersection shape).

As described above, according to the present example, since in addition to the effects of Example 1, future signal information can be acquired by receiving, in the vehicle via communication, the light color signal cycle information of the traffic signal 31 transmitted from the traffic signal 31, it becomes possible to further appropriately determine the signal state of the traffic signal as compared with Example 1.

The present invention is not limited to the examples described above, and includes various modifications. For example, the examples described above have been described in detail for the purpose of describing the present invention in an easy-to-understand manner, and are not necessarily limited to those having all the configurations described above. A part of the configuration of a certain example can be replaced by the configuration of another example, and the configuration of another example can be added to the configuration of a certain example.

REFERENCE SIGNS LIST

1, 1*a* vehicle control system
10 own vehicle
11 in-vehicle periphery recognition sensor
12 recognition range of in-vehicle periphery recognition sensor
20 other vehicle
31 traffic signal
100, 700 vehicle drive control device
101 signal information recognition unit
102 other object recognition unit
103 own vehicle information recognition unit
104, 730 signal state determination unit
105 other object travel path estimation unit
106 own vehicle travel path estimation unit
107 collision determination unit
110 display unit
111 warning unit
112 braking unit
701 signal cycle communication unit
720 signal cycle determination unit

The invention claimed is:

1. A vehicle drive control device, comprising:
a signal state determination unit that acquires, a plurality of times over a predetermined time, signal recognition information recognized by a signal information recognition unit, and determines a state of a signal based on the acquired signal recognition information,
wherein the signal state determination unit determines a state of the signal based on signal recognition information indicating a predetermined signal state when a number of times of acquisition of the signal recognition information indicating the predetermined signal state of signal recognition information acquired a plurality of times over the predetermined time is equal to or greater than a preset threshold; and
a collision determination unit that determines a possibility of collision between an own vehicle and another vehicle based on information on the other vehicle around an own vehicle recognized by an other vehicle recognition unit,
wherein when determining that there is the possibility of collision between the own vehicle and the other vehicle, the collision determination unit performs a warning to a driver of the own vehicle and/or vehicle control of the own vehicle based on a signal state determination result of the signal state determination unit.

2. The vehicle drive control device according to claim 1, wherein
the signal state determination unit changes a number of times of acquiring the signal recognition information and/or the predetermined time depending on a vehicle speed of the own vehicle.

3. The vehicle drive control device according to claim 1, wherein
the signal state determination unit changes a number of times of acquiring the signal recognition information and/or the predetermined time depending on at least one of a road sign, a stop line, and a distance to an intersection imaged by a camera included in the signal information recognition unit.

4. The vehicle drive control device according to claim 1, wherein
the signal state determination unit further includes a signal cycle determination unit that receives signal cycle information indicating a future signal state from a signal cycle communication unit, and
when a number of times of reception of signal cycle information indicating a predetermined signal state is equal to or greater than a preset threshold, a state of the signal is determined based on the signal cycle information indicating the predetermined signal state.

5. A vehicle control system, comprising:
a signal information recognition unit that recognizes information on a signal;

an other vehicle recognition unit that recognizes another vehicle around an own vehicle;
a signal state determination unit that acquires, a plurality of times over a predetermined time, signal recognition information recognized by the signal information recognition unit, and determines a state of the signal based on acquired signal recognition information,
wherein the signal state determination unit determines a state of the signal based on signal recognition information indicating a predetermined signal state when a number of times of acquisition of the signal recognition information indicating the predetermined signal state of signal recognition information acquired a plurality of times over the predetermined time is equal to or greater than a preset threshold; and
a collision determination unit that determines a possibility of collision between an own vehicle and an other vehicle based on information on the other vehicle around the own vehicle recognized by the other vehicle recognition unit,
wherein when determining that there is the possibility of collision between the own vehicle and the other vehicle, the collision determination unit performs a warning to a driver of the own vehicle and/or vehicle control of the own vehicle based on a signal state determination result of the signal state determination unit.

6. The vehicle control system according to claim 5, wherein
the signal state determination unit changes a number of times of acquiring the signal recognition information and/or the predetermined time depending on a vehicle speed of the own vehicle.

7. The vehicle control system according to claim 5, wherein
the signal state determination unit changes a number of times of acquiring the signal recognition information and/or the predetermined time depending on at least one of a road sign, a stop line, and a distance to an intersection imaged by a camera included in the signal information recognition unit.

8. The vehicle control system according to claim 5, wherein
the signal state determination unit further includes a signal cycle determination unit that receives signal cycle information indicating a future signal state from a signal cycle communication unit, and
when a number of times of reception of signal cycle information indicating a predetermined signal state is equal to or greater than a preset threshold, a state of the signal is determined based on the signal cycle information indicating the predetermined signal state.

9. A vehicle control method, wherein
a signal state determination unit acquires, a plurality of times over a predetermined time, signal recognition information recognized by a signal information recognition unit, and determines a state of a signal based on acquired signal recognition information,
wherein the signal state determination unit determines the state of the signal based on signal recognition information indicating a predetermined signal state when a number of times of acquisition of the signal recognition information indicating the predetermined signal state of signal recognition information acquired a plurality of times over the predetermined time is equal to or greater than a preset threshold,
a collision determination unit determines a possibility of collision between an own vehicle and an other vehicle based on information on the other vehicle around an own vehicle recognized by an other vehicle recognition unit, and
when determining that there is the possibility of collision between the own vehicle and the other vehicle, the collision determination unit performs a warning to a driver of the own vehicle and/or vehicle control of the own vehicle based on a signal state determination result of the signal state determination unit.

10. The vehicle control method according to claim 9, wherein
the signal state determination unit changes a number of times of acquiring the signal recognition information and/or the predetermined time depending on a vehicle speed of the own vehicle.

11. The vehicle control method according to claim 9, wherein
the signal state determination unit changes a number of times of acquiring the signal recognition information and/or the predetermined time depending on at least one of a road sign, a stop line, and a distance to an intersection imaged by a camera included in the signal information recognition unit.

12. The vehicle control method according to claim 9, wherein
a signal cycle determination unit receives signal cycle information indicating a future signal state from a signal cycle communication unit, and
when a number of times of reception of signal cycle information indicating a predetermined signal state is equal to or greater than a preset threshold, a state of the signal is determined based on the signal cycle information indicating the predetermined signal state.

* * * * *